(12) United States Patent
Tilton et al.

(10) Patent No.: US 9,797,551 B1
(45) Date of Patent: Oct. 24, 2017

(54) CLEANING AND LUBRICATING DEVICE FOR INTERIOR AND EXTERIOR GUIDE TRACK SYSTEMS

(71) Applicants: Dennis Gail Tilton, Tiburon, CA (US); Joanne Bystricky Arnett, Tiburon, CA (US)

(72) Inventors: Dennis Gail Tilton, Tiburon, CA (US); Joanne Bystricky Arnett, Tiburon, CA (US)

( * ) Notice: Subject to any disclaimer, the term of this patent is extended or adjusted under 35 U.S.C. 154(b) by 0 days.

(21) Appl. No.: 15/475,105

(22) Filed: Mar. 30, 2017

Related U.S. Application Data (60) Provisional application No. 62/315,177, filed on Mar. 30, 2016.

(51) Int. Cl.
  *F16N 19/00* (2006.01)
  *B63H 9/08* (2006.01)

(52) U.S. Cl.
  CPC .............. *F16N 19/00* (2013.01); *B63H 9/08* (2013.01); *F16N 2210/06* (2013.01)

(58) Field of Classification Search
  CPC .. B63H 9/08; B63H 9/10; F16N 19/00; F16N 2210/06
  See application file for complete search history.

(56) References Cited

U.S. PATENT DOCUMENTS

| | | | | |
|---|---|---|---|---|
| 3,058,138 A * | 10/1962 | Tomlinson | ............... | B63H 9/08 15/104.94 |
| 5,140,718 A * | 8/1992 | Toth | ......................... | B63H 9/10 114/221 R |
| 5,261,143 A * | 11/1993 | Toth | ........................ | A47L 25/00 114/221 R |
| 5,535,695 A * | 7/1996 | Southwell | ................ | B63H 9/08 114/221 R |
| 6,564,738 B1 * | 5/2003 | Van Gemert | ........... | B08B 1/008 114/89 |
| 8,083,031 B2 * | 12/2011 | Ganz | ........................ | F16N 3/08 114/343 |
| 2009/0200115 A1 * | 8/2009 | Williams | .................. | B63H 9/08 184/100 |

* cited by examiner

*Primary Examiner* — William E Dondero
*Assistant Examiner* — Mark K Buse
(74) *Attorney, Agent, or Firm* — Steven A. Nielsen (57) ABSTRACT

In the art of sailing vessels, various styled tracks retain an edge of a sail. A retained sail edge is prone to fouling by environmental conditions and becomes exceptionally difficult to remove. A disclosed Foiling Rabbit 100 or track conditioner, cleans, lubricates and otherwise services the sail void area of a track or other sail retention area. A cleaning wick 400 may have main body 430 attached to a thickened or rolled interior edge and outer surface 430. An inner edge of the wick may be retained within a wick retaining cartridge 7. A lubricant cartridge 1 may be attached to the wick retaining cartridge. The lubricant cartridge may define one or more reservoir bodies 2a which may contain a lubricant and cleaning fluid. By use of various direct and indirect channels, and controlled capillary action, lubricant flows from the lubricant cartridge to a workpiece removes debris and lubricates.

8 Claims, 9 Drawing Sheets

CLEANING AND LUBRICATING DEVICE FOR INTERIOR AND EXTERIOR GUIDE TRACK SYSTEMS

CROSS-REFERENCE TO RELATED APPLICATIONS

This application claims the benefit and priority of U.S. Application 62/315,177 filed on Mar. 30, 2016, the contents of which are incorporated herein by reference as if restated herein.

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever. Such trademark(s) may include, "Track Rabbit", "Foil Rabbit" and "Foiling Rabbit."

BACKGROUND OF THE INVENTION

(1) Field of the Invention

The invention generally relates to lubrication and cleaning systems. More particularly, the invention relates to means and methods of cleaning and lubricating within longitudinal voids or interior channels such as those found sail retention systems.

(2) Description of the Related Art

The known related art fails to anticipate or disclose the principles of the present invention.

In the related art, U.S. Pat. No. 5,535,695 by Southwell of Jul. 16, 1996 discloses a bottle of lubricant attached to a plate disposed to a spar track. The lubricant flows freely and is prone to over lubrication.

U.S. Pat. No. 5,140,718 by Toth of Aug. 25, 1992 discloses a spar track cleaning system but fails to provide effective means of controlled lubrication administration.

Currently, in the sport of competitive sailing, sail edge channels, spar tracks and other voids are prone to the buildup of debris which in turn makes sail handling an arduous task. There is no known effect system or method to efficiently clean and lubricate spar tracks.

Thus, there is a long felt need in the art for the present invention.

BRIEF SUMMARY OF THE INVENTION

The present invention overcomes shortfalls in the related art by presenting an unobvious and unique combination and configuration of methods and components to clean and lubricate spar tracks and similar voids by use of a compact capillary action dispenser. Disclosed embodiments include the use of wick runners disposed within wick retaining channels defined within a main body with the main body further defining container voids and a capillary communication system. A disclosed wick system may comprise first and second cylinder like wick runners attached by use of a planar wick. A first wick runner may be disposed within a wick retaining channel while a second wick runner may be in slideable attachment within a spar track or similar void. The planar wick may be in contact with a capillary communication system of the main body wherein lubricant and/or cleaner fluid has a predictable flow pattern between the main body and the spar track or other target void.

The invention overcomes shortfalls in the related art by using an artful wick system wherein a flexible planar wick may absorb and comport to the irregularities or flexing of a sail mast while keeping a main body adjacent to a spar tack and allowing the main body to be compact for ease of use and untangled movement along a spar track. The relatively thin, planar wick body 430 overcomes shortfalls in the art by allowing the wick to flex during use.

Embodiments of the invention may also include the use of T slot wick system used to comport with interior tracks with T type voids.

These and other objects and advantages will be made apparent when considering the following detailed specification when taken in conjunction with the drawings.

REFERENCE NUMERALS IN THE DRAWINGS 1 lubricant and cleaner cartridge
1A end stop
2 reservoir receptacle
2A reservoir body
3 towable attachment point
4 body connector tab
4A body connector slot
5 capillary channel
5A capillary ports
6 wick retaining void or wick retaining channel
7 wick retaining cartridge
8 reservoir communication ports
8A capillary distribution manifold
9 wick slots
10 cartridge lock slot
10A cartridge lock
10B cartridge lock access port
11 lock tool access void
12 reservoir retainer lock
12A reservoir retainer void defined within the lubricant cartridge 1
13 vent or void for aspiration of fluid
14 vent port lock
15 security toggles
15A cavities or security toggle cavities
16 atmosphere stop or void
17 traction ribs
100 lubrication system, sometimes called the Track Rabbit, Foil Rabbit, or Foiling Rabbit
330 towable attachment point or void defined within a lubricant cartridge
400 wick in general
430 outer surface of wick 450 main body of wick
470 inner surface of a wick
475 curved section of wick
480 wick runner in general
500 spar or any component retaining a sail edge

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

Any and all the above references and U.S. patents and applications are incorporated herein by reference. Aspects of the invention can be modified, if necessary, to employ the systems, functions and concepts of the various patents and applications described above to provide yet further embodiments of the invention.

In general, disclosed embodiments may be described as:

A lubricant & cleaner cartridge 1 may comprise container for transport of both lubricant and cleaner volumes either in self-contained vessels or fluid stored within the cartridge 1, the cartridge 1 filled during manufacture and the fluid covered or secured in place a reservoir retainer lock 12. The reservoir retainer lock 12 may be positioned by sliding into the cartridge and fixed in place by secure means of screws, glue or various methods. The reservoir retainer clock may comprise or define one or more vents 13 for aspiration of lubricant or any flowable substance retained in a reservoir receptacle 2, the reservoir receptacle 2 located below the vents 13 and the reservoir receptacle 2 contained or defined within the cartridge 1.

A vent port lock 14 slides into the cartridge 1 above and after the reservoir retainer lock 12 is in place. The vent port locks 14 may have a number of security toggles 15, the security toggles comprising springing resilient material which is compressed upon entry of the vent port lock 14 into the cartridge and then rebound to neutral position within mirror plus sized cavities or security toggle recess or cavities 15A to receive the volume of lubricant, with the security toggles 15 acting as a lock for the vent port lock 14, preventing foreign material from ingress to the lubricant contained within the reservoir receptacle 2.

An atmosphere stop 16 is a designed protrusion, sometimes rounded, which engages with the one or more vents 13 to seal off the vents 13, preventing flowable material or lubricant from exiting the cartridge 1 in an uncontrolled fashion by forming a vacuum seal. When the vent port lock 14 is moved, by placing one's digit upon the traction ribs 17, the short distance allowed by the security toggle cavities' 15A natural aspiration is then allowed due to the atmosphere stop 16 no longer being engaged with the vent(s) 13, giving standard earth atmosphere or ambient air access to the internal volumes contained within the cartridge, this movement of air, allows ingress of atmosphere to replace the lubricant of the reservoir receptacle 2 to be moved downward due to gravity and capillary action or capillary draw acting upon any flowable volume contained within the reservoir receptacle. Once this action is engaged and flowable material is active, the lubricant or flowable material may be transported through reservoir communication ports 8 located at the base of the cartridge 1 and extending through the body connector tab 4 and continues into a capillary distribution manifold 8a which resides within a wick retainer cartridge 7.

The two bodies of the lubricant retainer 1 and the wick retaining cartridge 7 may be connected by means of a body connector tab 4 engagement to the top of wick retaining cartridge 7 which has body connector slot 4A as a mirror to the body connector tab 4 in fashion so as to make a positive connection but move no further within the body connector slot 4A then the end Stop 1A, then the cartridge lock 10a may move from a position within the cartridge lock slot 10 via a tool being placed in lock tool access 11 via cartridge lock access port 10B.

From a capillary distribution manifold, 8a flowable material or lubricant is transported via capillary channels 5 to capillary ports 5a which exit within wick retaining channels 6 to apply lubrication to wicks 400 attached within (7). Parallel openings (9) wick slots allow the exit of wick material from within the body of a wick retaining cartridge, to apply lubricant to a work surface.

When a line is attached to a towable attachment point 3 and another in a similar port at the base of a wick retaining cartridge the device is ready to be used. By insertion or connection of the special designed cleaner wick 400, which matches the work surface in mirror fashion, and the device or Foiling Rabbit is then moved within the workpiece and the flowable material or lubricant is transported to the work surface and a cleaning, removal of debris and reconditioning of the work surface is commenced.

Thereafter by rotation of the complete body of the Foiling Rabbit to engage the special designed lubrication wick 400 and the Foiling Rabbit is towed along the work surface, lubrication is distributed down a capillary distribution manifold 8a to a capillary channel 5 and flowing into contact with a lubrication wick 400 which then, by capillary action, lubrication is transported to the outer zones of the wick and deposited upon the work surface. If only a portion of the work surface needs lubrication then the Foiling Rabbit 100 will deposit only an amount needed by static friction physics drawing the lubrication from the surface via the various wick designs.

Figure 1:
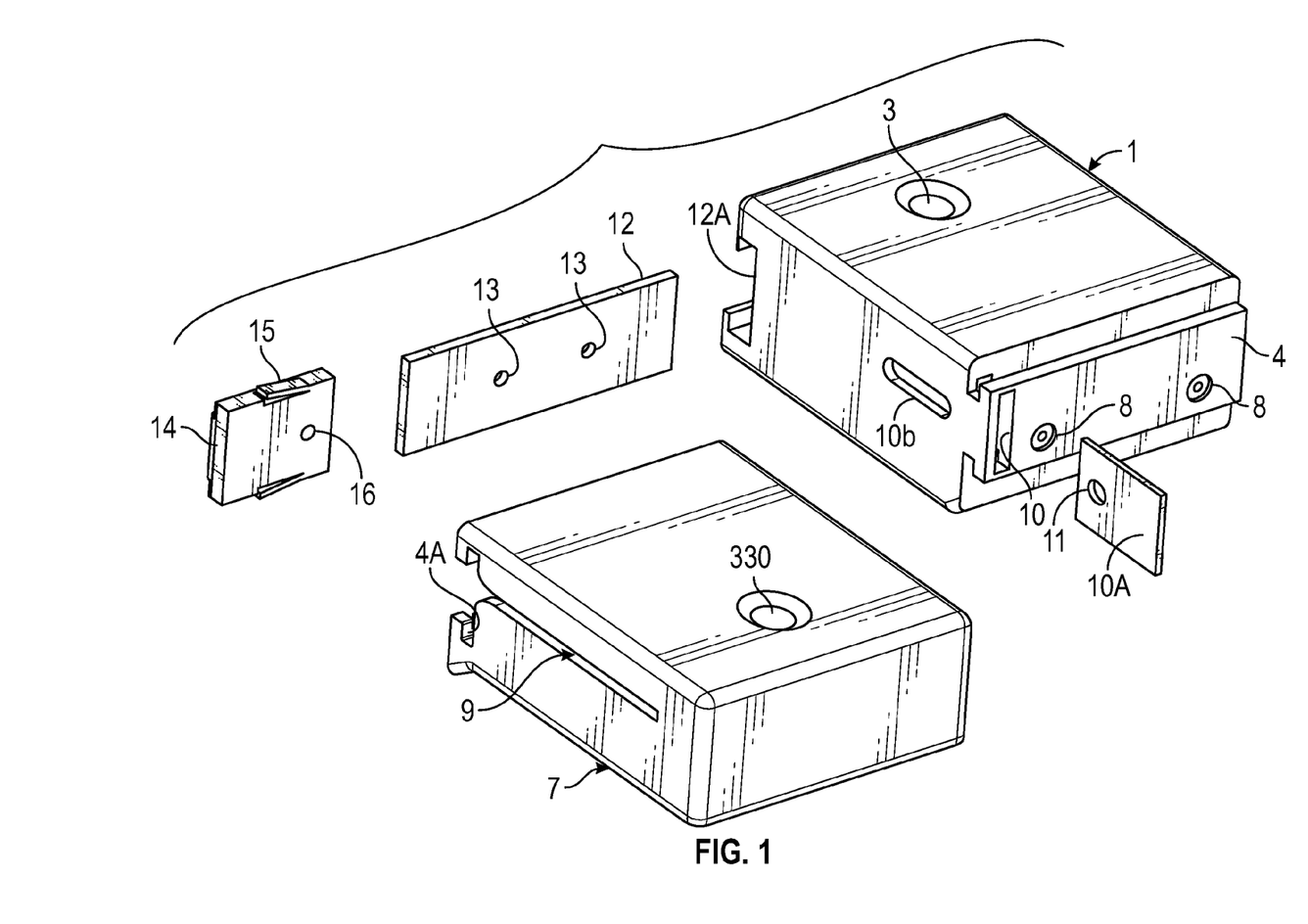
FIG. 1 depicts disclosed components

FIG. 1 depicts a disclosed system that may comprise a lubricant and cleaner cartridge 1 which may attach to a wick retaining cartridge 7.

A lubricant cartridge 1 may comprise or define: one or more reservoir communication ports 8, a cartridge lock slot 10, a cartridge lock 10a, a body connector tab 4, and a cartridge lock 10A. A reservoir retainer lock 12 may be inserted into or through a reservoir retainer void 12A and further secured by a vent port lock 14, the vent port lock sometimes comprising or defining a security toggle and an atmosphere stop 16.

A wick retaining cartridge 7 may comprise or define wick slots, sometimes filled with a wick body, the wick slots 9 sometimes being thinner in width as compared to an inner side of a wick. A wick retaining cartridge may further define or comprise a body connector slot.

Figure 2:
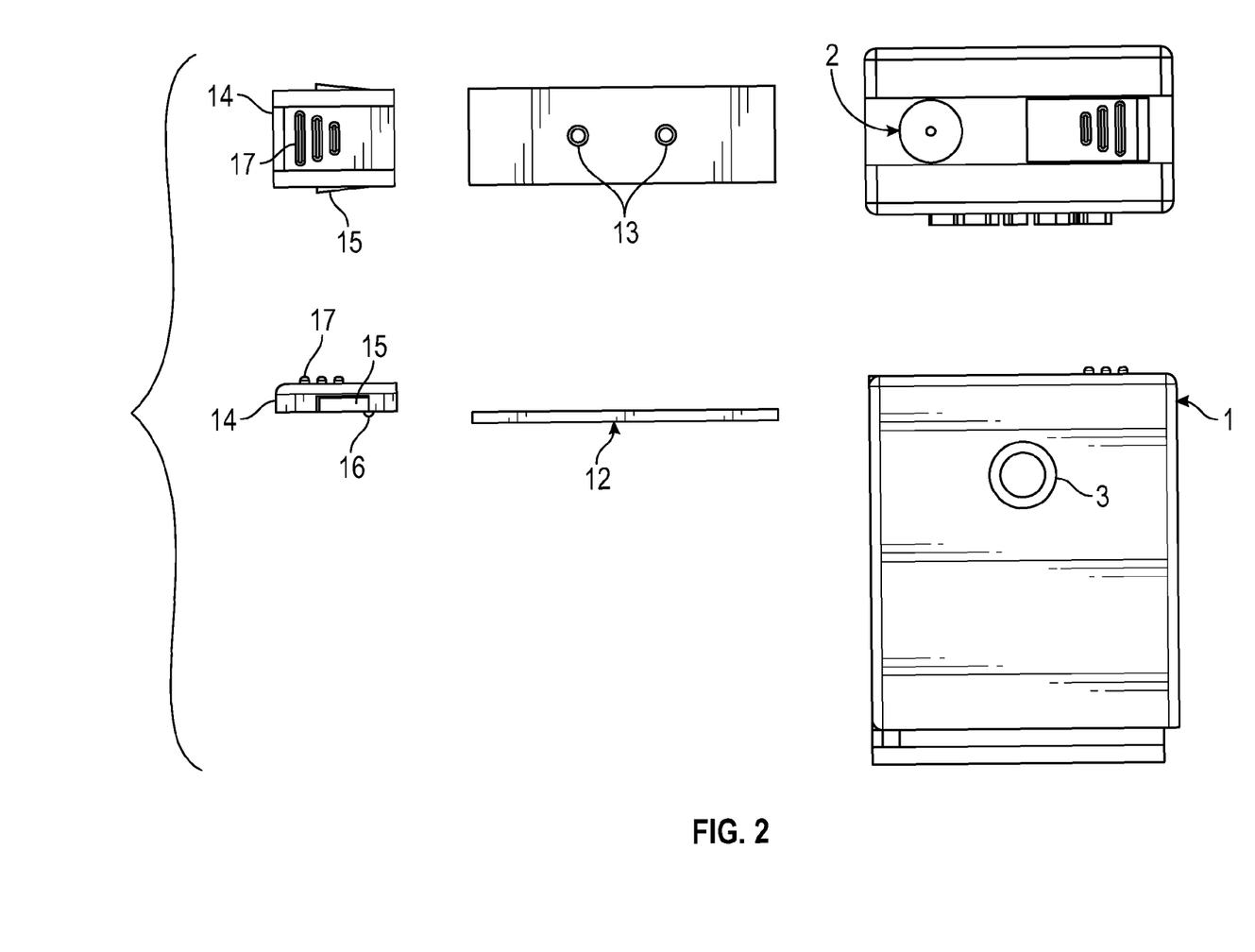
FIG. 2 depicts disclosed components

FIG. 2 depicts a lubricant and cleaner cartridge 1 comprising or defining a towable attachment point or void 3 and a reservoir receptacle 2. A lubricant cartridge 1 may further comprise or define one or more vents 13, the vents sometimes used to allow for the release of lubricant or other fluid contained within the lubricant cartridge 1. A side view of a reservoir retainer lock 12 is presented. A top view of a vent port lock 14 is shown with traction ribs 17 and security toggles 15. A side view of a vent port lock 14 is also depicted and may include an atmosphere stop 16 adjacent to or near a security toggle 15.

Figure 3:
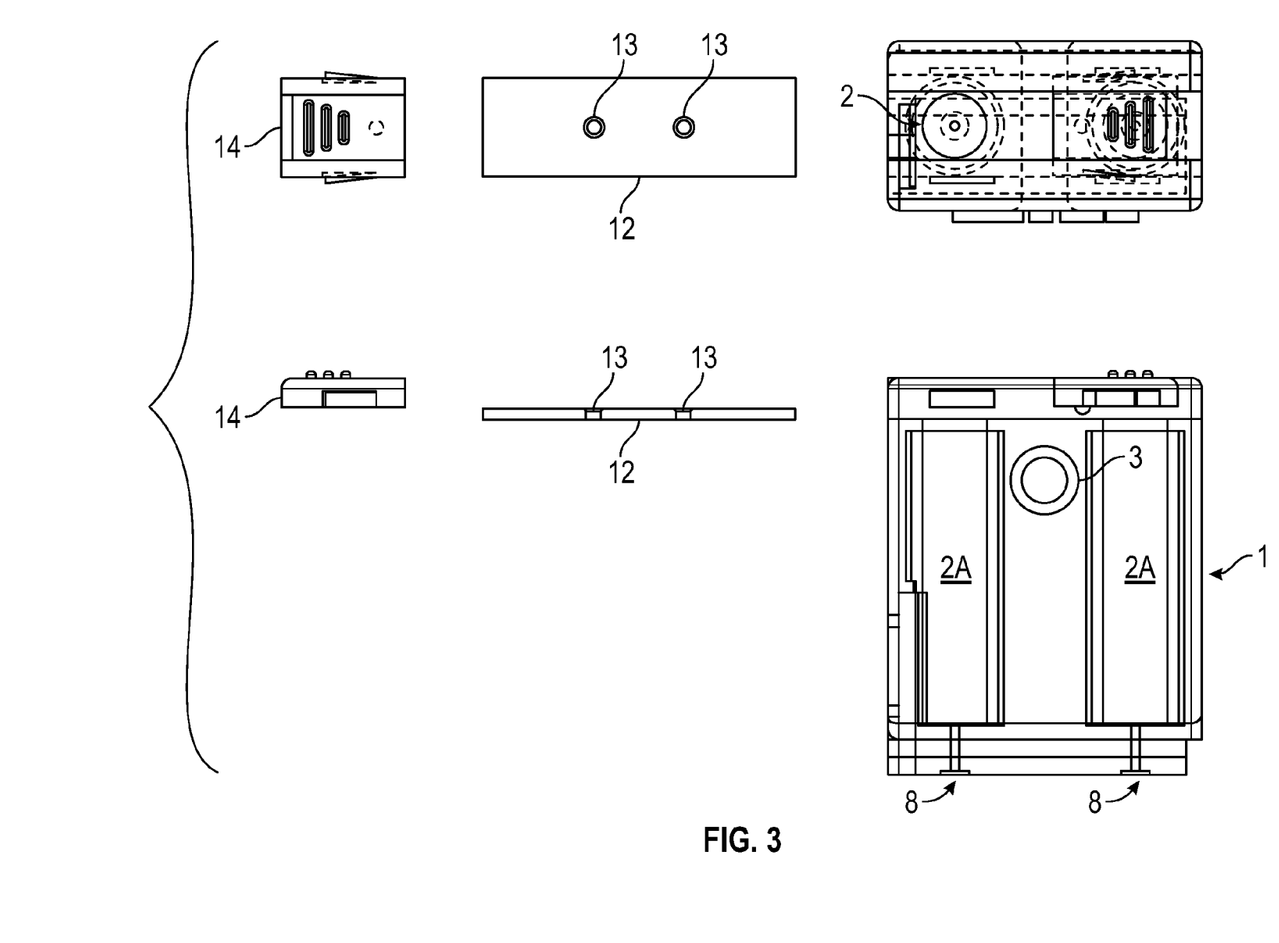
FIG. 3 depicts disclosed components

FIG. 3 depicts a sectional view of FIG. 2. The main body of the lubricant cartridge 1 defines one or more internal reservoir bodies 2A, with each reservoir body including or defining a reservoir receptacle.

Figure 4:
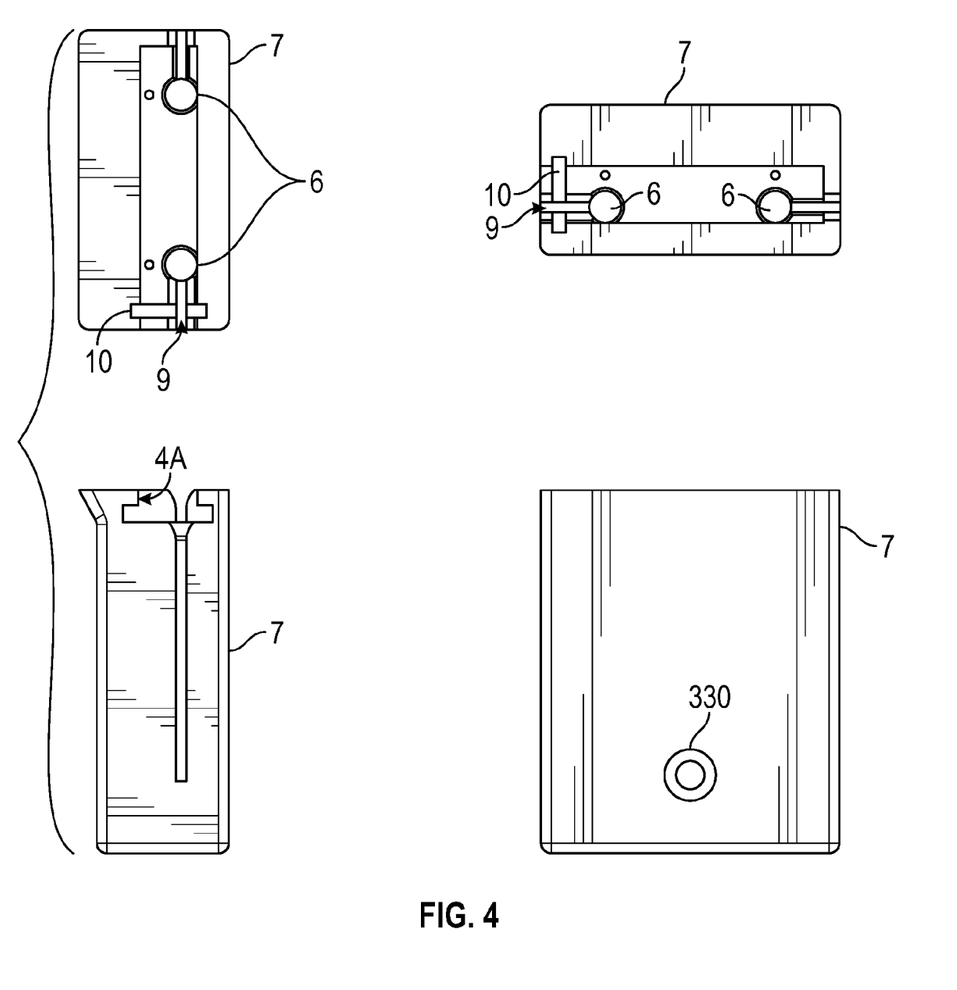
FIG. 4 depicts disclosed components

FIG. 4 depicts a wick retaining cartridge 7, wherein the wick retaining cartridge defines one or more wick retaining voids 6. Each wick retaining void 6 may sometimes retain an inner or proximal rolled or thickened edge of a wick 400. The inner or proximal rolled or thickened edge of a wick 400 overcomes shortfalls in the art as the proximal thickened edge may be retained within the wick retaining void 6 while allowing the main body of the wick 450, see FIG. 6, to travel outwardly or distally through a wick slot 9, a wick slot being defined within a wick retaining cartridge. Thus, fluid or lubricant originating from the lubricant cartridge flows to the wick retaining voids 6, into the proximal thickened edge of the wick, to the main body of the wick, to the outer or distal surface of the wick, wherein the lubricant meets the workpiece, such as the sail void area of a track or other sail retention area.

Figure 5:
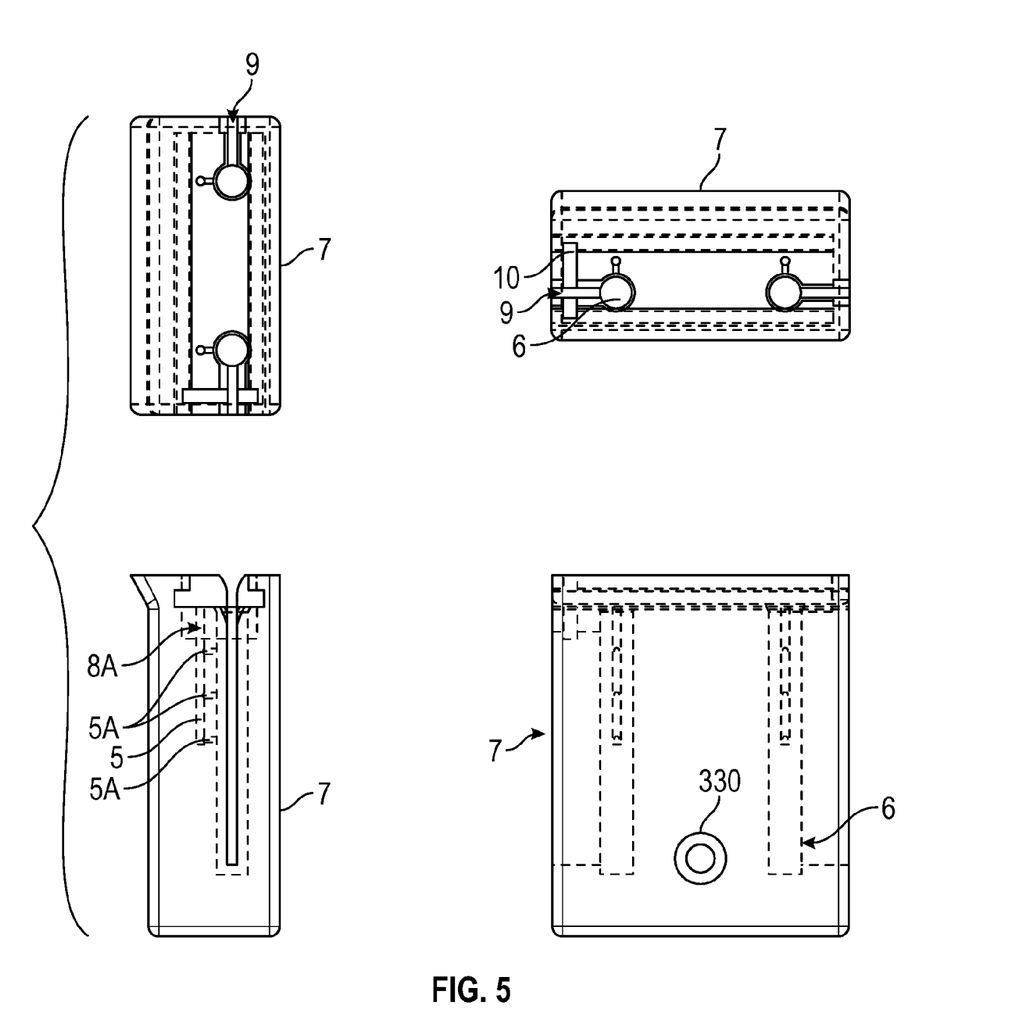
FIG. 5 depicts disclosed components

FIG. 4 includes a depiction of a cartridge lock slot 10 and a body connector tab 4A FIG. 5 depicts a sectional view of FIG. 4, and includes depictions of a capillary distribution manifold 8A and a capillary channel 5, all defined within a wick retaining cartridge 7. The artful integration and combination of the capillary distribution manifold 8A and a capillary channel 5 provides a mechanical advantage and overcomes shortfalls in the art by efficiently accepting fluid from the lubricant cartridge and by transferring a correct amount of lubricant to a wick. In the best mode known to date, the capillary channel 5 is approximately half or less than half of the length of the wick retaining void 6. By using such a reduced retaining wick void 6 length prior art problems of over lubrication have been solved.

Figure 6:
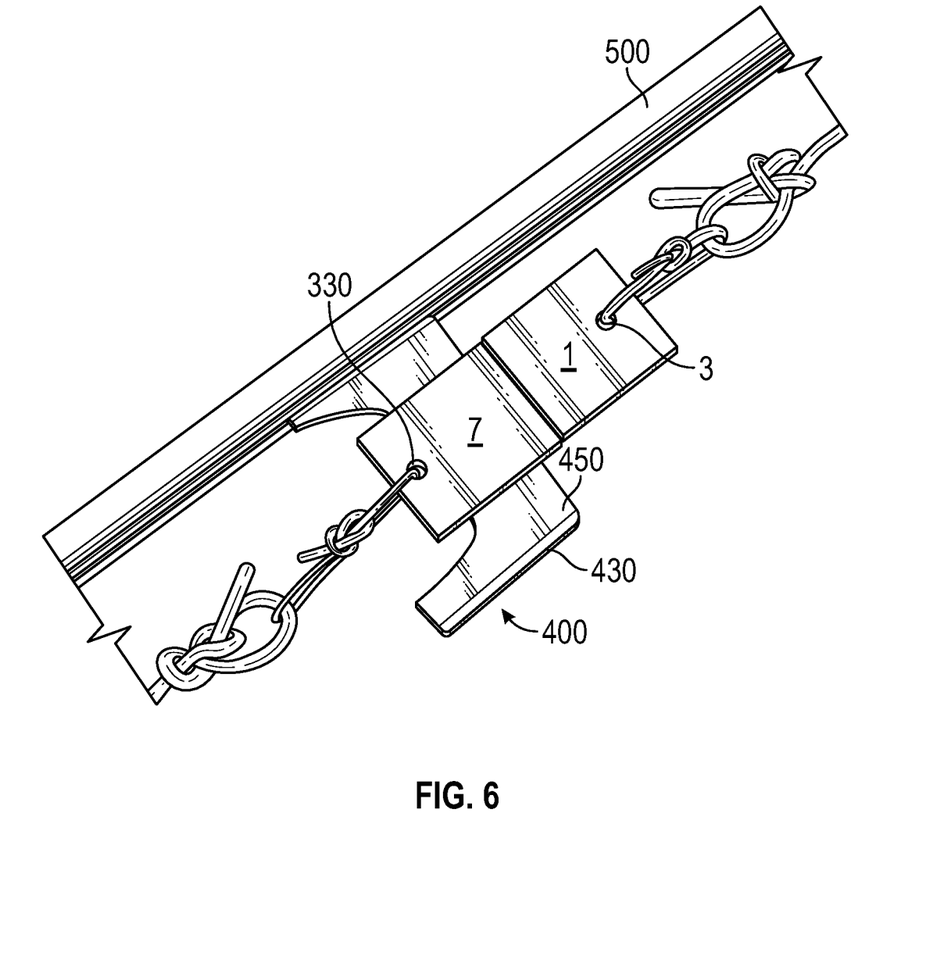
FIG. 6 depicts a disclosed embodiment in use

FIG. 6 depicts a disclosed embodiment 100 in use. A wick 400 may comprise a main body 450 or planar surface attached to an outer or lateral surface 430, the lateral surface may be rolled or of greater thickness so as to securely attach within a work surface. FIG. 6 depicts a rolled or thickened outer or distal wick surface 430 inserted into a void of a spar 500. By use of rope tied into a void defined within a lubricant cartridge and a void 3 defined within a wick retaining cartridge 7.

Figure 7:
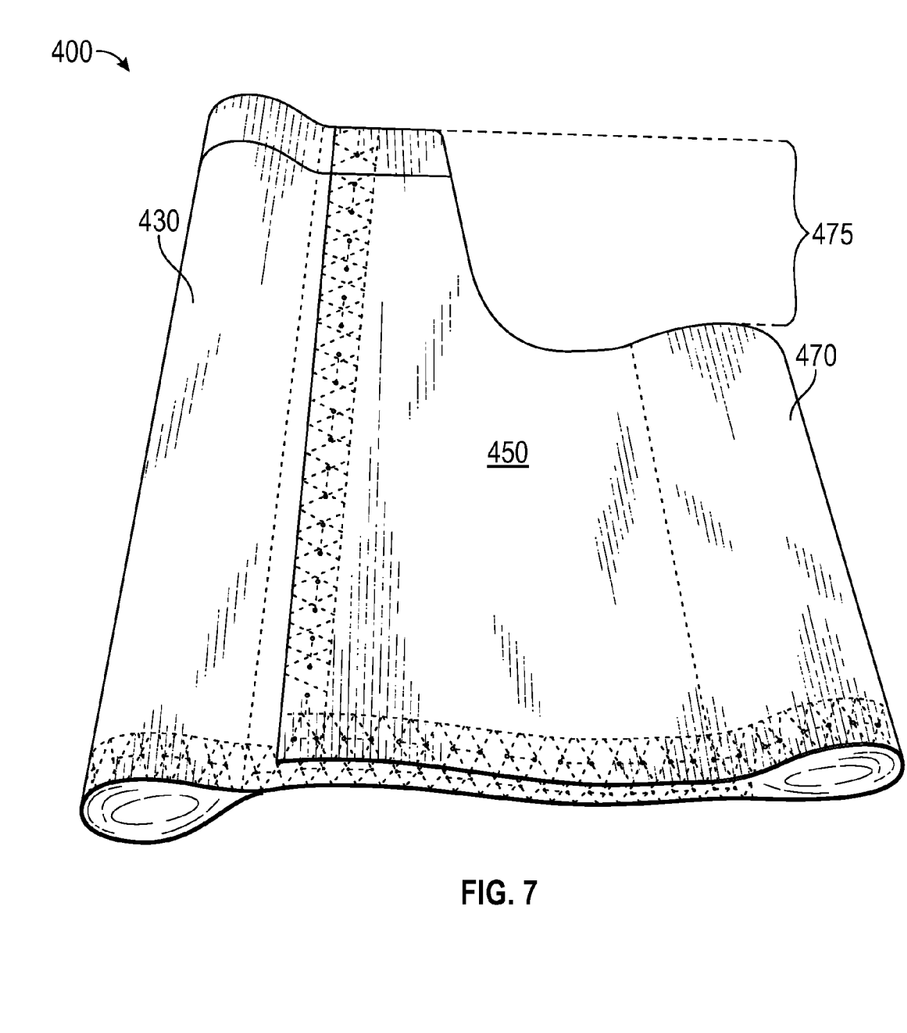
FIG. 7 depicts a perspective view of a disclosed wick

FIG. 7 depicts a disclosed wick 400 comprising a main body 450 attached to a rolled or expanded outer surface 430 and inner surface 470. Increased wicking efficiency is achieved by use of a curved section 475 in the main body 450.

Figure 8:
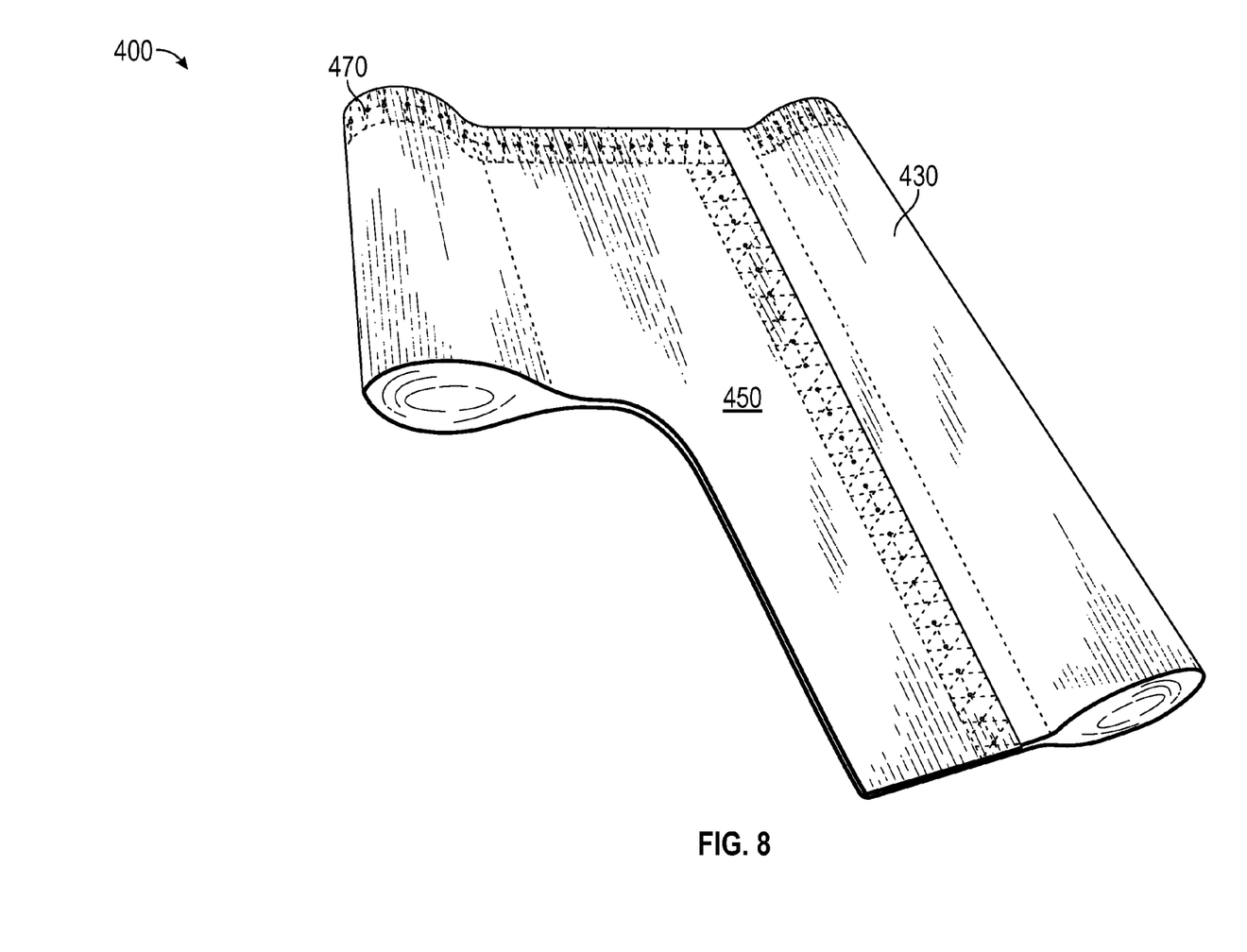
FIG. 8 depicts a perspective view of a disclosed wick

FIG. 8 depicts a different view of FIG. 7.

Figure 9:
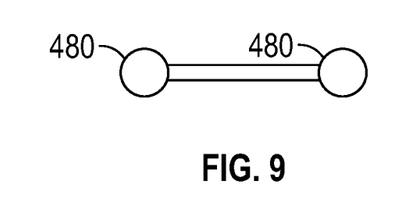
FIG. 9 depicts a top view of a disclosed wick
Figure 10:
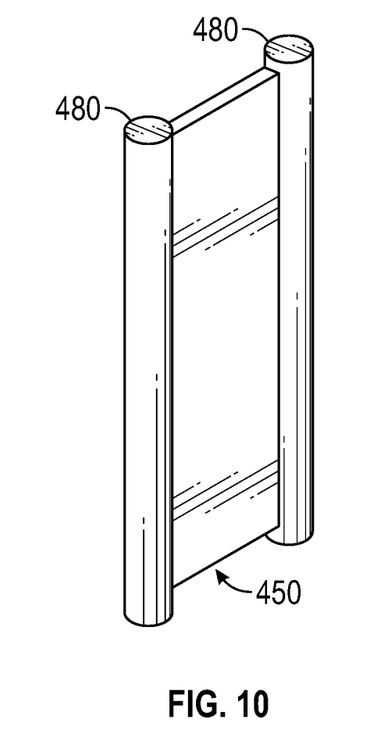
FIG. 10 depicts a perspective view of a disclosed wick

FIG. 9 depicts an alternative wick embodiment being rectangular is shape and having two wick runners 480 on either side.

In general, disclosed embodiments may be rectangular in shape and composed of resilient material to withstand the physical impact and saltwater exposure commonly encountered by sail boat components. Disclosed embodiments retain a portion of a wick system, apply fluid to the wick system and then allow fluid to travel to a desired area by means of capillary action, so as to not over lubricate the target area. The artful use of capillary action vitiates the need for fluid pumps and other bulky means of fluid delivery.

What is claimed is:

1. A lubrication system (100) comprising:
  a) a lubricant cartridge (1) defining a reservoir receptacle (2), the reservoir receptacle being the top opening for a reservoir body (2A) the reservoir body defined within the lubricant cartridge; a reservoir retainer lock (12) slideably connected to the lubricant cartridge and covering the reservoir receptacle, the reservoir retainer lock defining one or more vent voids (13), the reservoir retainer lock further secured to the lubricant cartridge by use of a vent port lock (14) the vent port lock comprising one or more security toggles (15) and the vent port lock further comprising traction ribs (17), the lubricant cartridge defining a reservoir retainer void (12A) the reservoir retainer void accepting and retaining the reservoir retainer lock and the vent port lock; the lubricant cartridge further defining a body connector tab (4) the body connector tab defining a cartridge lock slot (10), the cartridge lock slot configured to accept a cartridge lock (10A), the cartridge lock defining a lock tool access void (11), the lubricant cartridge further defining a cartridge lock access port (10B); b) a wick retaining cartridge (7) defining a body connector slot (4A), the body connector slot comporting to and accepting the body connector tab, so as to slideably connect the wick retaining cartridge to the lubricant cartridge; the wick retaining cartridge further defining wick slots (9) upon exterior walls of the wick retaining cartridge; the wick retaining cartridge further defining a capillary distribution manifold (8A), the capillary distribution manifold aligned with the reservoir communication port so as to accept fluid from the reservoir communication port, the wick retaining cartridge further defining a capillary channel (5) and a plurality of capillary ports (5A); the capillary distribution manifold, capillary channel and plurality of capillary ports in fluid communication so as to transmit fluid to a wick retaining void (6), the wick retaining void defined within the wick retaining cartridge and the wick retaining void connected to the wick slots.

2. The system of claim 1 wherein the vent port lock further defines an atmosphere stop (16).

3. The system of claim 1 wherein the wick retaining cartridge defines a towable attachment void (3) and the lubricant cartridge defines a towable attachment void (330).

4. The system of claim 1 further including a wick (400) the wick comprising a main body (450) disposed within a wick slot, the wick further comprising an inner surface (470) disposed within the wick retaining void.

5. The system of claim 4 wherein the wick further comprises an outer surface (430).

6. The system of claim 5 wherein the outer surface of the wick is of greater thickness than the main body of the wick.

7. The system of claim 6 wherein a curved section (475) of the main body of the wick is disposed between the inner surface and the outer surface.

8. The system of claim 6 wherein the outer surface of the wick comports to a void defined within a workpiece.

\* \* \* \* \*